METHOD OF CALIBRATING A TEMPERATURE GAUGE

Filed Nov. 19, 1958 2 Sheets-Sheet 1

INVENTORS
WYLIE C. KIRKPATRICK
JOHN W. HARRISON
ROBERT D. LOWRY
BY Cushman, Darby & Cushman
ATTORNEYS

METHOD OF CALIBRATING A TEMPERATURE GAUGE

Filed Nov. 19, 1958 2 Sheets-Sheet 2

INVENTORS
WYLIE C. KIRKPATRICK
JOHN W. HARRISON
ROBERT D. LOWRY

BY Cushman, Darby & Cushman
ATTORNEYS

United States Patent Office 3,127,760 Patented Apr. 7, 1964

3,127,760
METHOD OF CALIBRATING A TEMPERATURE GAUGE

Wylie C. Kirkpatrick, Wayland, and John W. Harrison and Robert D. Lowry, Winchester, Mass., assignors to W. R. Grace & Co., Cambridge, Mass., a corporation of Connecticut Filed Nov. 19, 1958, Ser. No. 774,913
2 Claims. (Cl. 73—1)

This invention relates to new uses of heat shrinkable polymers.

It is an object of the present invention to utilize the controlled shrinkage of heat shrinkable polymers.

It is another object to utilize heat shrinkable polymers to actuate control devices.

A further object is to utilize heat shrinkable polymers to break circuits.

An additional object is to utilize heat shrinkable polymers to make circuits.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now then found that these objects can be attained by utilizing filaments, e.g. rods, or films of heat shrinkable polymers in the manner shown below. The polymer can be heat shrinkable polyethylene terephthalate (Mylar), heat shrinkable nylon, heat shrinkable polystyrene, heat shrinkable vinylidene chloride resin (saran), heat shrinkable polyethylene, etc. The heat shrinkable polymer can be either mono or biaxially oriented. The preferred polymer is heat shrinkable irradiated polyethylene. The heat shrinkable irradiated polyethylene can be prepared, for example, by irradiating to an extent of 2 to 100 megarad, preferably 8 to 20 megarad, and then hot stretching 100 to 900% either uniaxially or biaxially. The irradiation and stretching can be accomplished as described in Rainer application, Serial No. 516,236, filed June 17, 1955, now Patent 2,877,500, issued March 17, 1959.

In the following examples, there was employed a polyethylene monofilament, or, specifically, Alathon 14, molecular weight of 20,000 and density 0.916, that had been irradiated to an extent of 12 megarad and either uniaxially stretched 350% or a film that had been biaxially stretched 350% to give a heat shrinkable product.

Heat shrinkable polyethylene shrinks progressively with added increments of heat. Thus, if it is raised to a certain temperature, allowed to shrink the maximum amount at that temperature and cooled, no further shrinkage occurs if it is reheated to that temperature, i.e.

it is in what may be called a conditioned state. However, if the temperature is increased beyond the original hot temperature, then shrinkage will again take place. This process can be repeated with added increments of heat.

Figure 1:
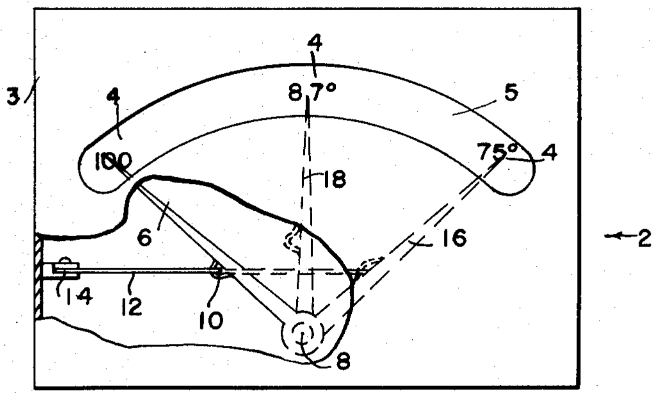
FIGURE 1 is a side elevation, partially broken away, of a temperature gauge employing the heat shrinkable polyethylene.

Advantage of this feature can be taken, for example, in the preparation of a temperature gauge which will record the maximum temperature to which some material or process is subjected. Thus, as shown in FIGURE 1, there is provided a temperature gauge 2 comprising a box 3 and having appropriate temperature markings 4 on dial 5. The gauge comprises a pointer 6 pivoted about point 8. Attached to the pointer at 10 is heat shrinkable polyethylene monofilament 12. The other end of the monofilament is secured to the outside of the box 3 by fastening means 14. The polyethylene is conditioned so that it does not commence to shrink below the temperature at the right hand side of the temperature dial, 75° C. in FIGURE 1. The pointer 6 initially has the position indicated by the dotted lines 16. When a temperature of 87° C. is reached the pointer assumes the position shown by dotted lines 18. Finally, at 100° C. the pointer assumes the position shown by the solid lines 6. Thus, the device performs as an inexpensive single application thermal indicator in order to maintain a permanent record.

If an appropriate timing mechanism is attached to the temperature gauge, then it can be employed to indicate the time any particular temperature is reached. This is useful in many reactions as showing the course of the reaction up to the maximum temperature.

It likewise can be employed as a thermostat wherein a device is either turned on or off as desired at a predetermined temperature on the gauge.

Figure 2:
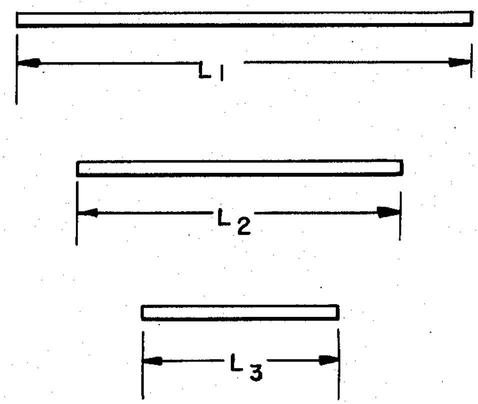
FIGURE 2 is a top plan view illustrating various degrees of shrink of a heat shrinkable polyethylene monofilament.

The device can also be useful whenever it is desired to have a pre-determined amount of shrink. FIGURE 2 illustrates this aspect of the invention. As shown in FIGURE 2, a heat shrinkable polyethylene monofilament initially had a length L1 at room temperature. When heated to 85° C. it shrank to new length L2. When heated subsequently to 120° C., it shrank to new length L3.

In a specific example of this aspect of the invention irradiated, biaxially oriented polyethylene film was shrunk in the following manner. A sample of the biaxially oriented film 5" x 1⅛" x 0.009 was hung the long way under a load of 7.4 grams in a water bath at various temperatures, following which the sample was returned to room temperature while water was removed from the bath and then replaced with slightly colder temperature. The length of the sample was recorded and the sample was re-introduced into the water bath at 5° C. below its previous treatment temperature and raised at the rate of about 10°/minute to 5° C. above its previous treatment temperature, cooled to room temperature and the new length of the sample recorded. The following results were recorded:

Conditioned at 75° C., cooled to room temperature and raised to 80° C., shrank 4.7% more
Conditioned at 80° C., cooled to room temperature and raised to 85° C., shrank 6.25% more
Conditioned at 85° C., cooled to room temperature and raised to 90° C., shrank 7.8% more
Conditioned at 90° C., cooled to room temperature and raised to 95° C., shrank 12.5% more
Conditioned at 95° C., cooled to room temperature and raised to 100° C., shrank 18.7% more The total shrink at 100° C. was 50% more than that at 75° C., so that the film treated at 100° C. was half the length of the film at 75° C.

The present invention is particularly adapted to safety devices which will take appropriate action when the temperature rises too high. Excessive heating occurs, for example, from fire or from electrical or mechanical heating from an overloaded system. By utilizing a heat shrinkable monofilament or tube or rod or a section of film so that its shrinking moves a control device or releases a fluid, either liquid or gaseous, it functions as a safety mechanism. This phase of the invention is illustrated in FIGURES 3–6.

Figure 3:
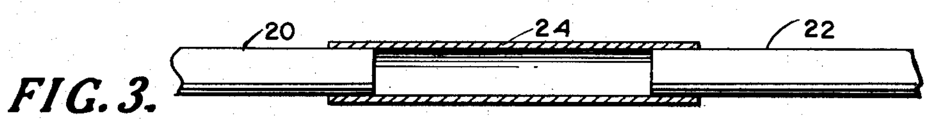
FIGURE 3 is a side elevation partially in section of a safety control utilizing the invention.

In FIGURE 3 there is shown a sprinkler system comprising copper tubing 20 and 22 through which flows water. At various places in the system, the copper tubing is replaced by heat shrinkable biaxially stretched polyethylene tubing 24. In the event of fire, the heat causes the polyethylene tubing 24 to shrink and it is pulled free from the two sections 20 and 22 of copper tubing, and water will then pour through the openings thus created between the sections of copper tubing.

Figure 4:
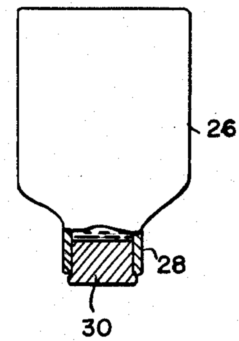
FIGURE 4 is a side elevation partially in section of an alternative safety device.

In FIGURE 4, cylinder 26 is filled with carbon dioxide gas under pressure. The opening in the neck 28 of the cylinder is closed by a heat shrinkable biaxially stretched polyethylene rod closure 30. In the event of fire or excessive heat, the closure 30 shrinks, falls out, and permits the release of the fire extinguishing carbon dioxide gas.

Figure 5:
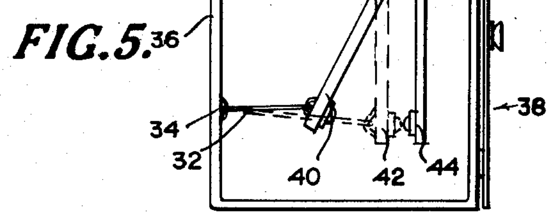
FIGURE 5 is a side elevation of a fuse box utilizing heat shrinkable polyethylene film.

Biaxially oriented polyethylene film was twisted into a cord 32, as shown in FIGURE 5. One end of the cord was fastened to a fixed point 34 on the outside 36 of switchbox 38. The other end was attached to the moveable arm 40 of a switch. In normal operation, moveable arm 40 is in the position indicated by dotted lines 42 and in contact with the fixed arm 44 of the switch. In case of overloading of the circuit, cord 32 shrinks due to the heat and breaks the circuit by moving arm 40 from the position indicated by the dotted lines to that of the solid lines. In effect, the heat shrinkable polymer acts as a fuse. However, normal fuses act by melting. The present devices operate on the wholly different principle of utilizing shrink properties of the polymer. In the device shown in FIGURE 5, the switch can be reset by replacing the heat shrunk cord by a new heat shrinkable cord.

Figure 6:
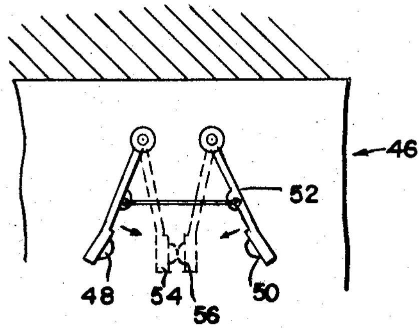
FIGURE 6 is a side elevation showing a device for completing the circuit in a fire alarm system.

The heat shrinking properties can also be taken advantage of to close a circuit such as in the fire alarm system 46, shown in FIGURE 6. Under normal conditions, electrical contacts 48 and 50 are kept apart by heat shrinkable polyethylene monofilament 52. In the case of fire, the heat causes monofilament to shrink and cause electrical contacts 48 and 50 to assume the positions 54 and 56 indicated by the dotted lines and thus complete the circuit and give the alarm.

What is claimed is:

1. A method of calibrating a temperature gauge comprising employing a monofilament operatively connected with temperature indicating means and consisting of a heat shrinkable polymer, which polymer has been stretched at least 350% in at least one direction in a temperature gauge, heating the temperature gauge to a first temperature sufficiently to partially shrink the monofilament, recording the temperature, and then heating the temperature gauge to a second temperature higher than said first temperature and thereby further shrinking said monofilament and recording said second temperature.

2. A method according to claim 1 wherein the heat shrinkable polymer is heat shrinkable, irradiated polyethylene, said irradiation being to an extent of 2 to 100 megarad.

References Cited in the file of this patent

UNITED STATES PATENTS

| | | |
|---|---|---|
| 627,524 | Petersen | June 27, 1899 |
| 1,334,960 | Mungall | Mar. 30, 1920 |
| 1,556,573 | Andersen | Oct. 13, 1925 |
| 1,635,555 | MacGregor | July 12, 1927 |
| 2,259,846 | Vernet et al. | Oct. 21, 1941 |
| 2,470,711 | Moberg | May 17, 1949 |
| 2,487,156 | Luttge et al. | Nov. 8, 1949 |
| 2,487,268 | Oleson | Nov. 8, 1949 |
| 2,502,240 | Wiley | Mar. 28, 1950 |
| 2,546,085 | Briscoe et al. | Mar. 20, 1951 |
| 2,588,788 | Zell | Mar. 11, 1952 |
| 2,695,521 | Nazerenko | Nov. 30, 1954 |
| 2,810,044 | Strange | Oct. 15, 1957 |
| 2,871,952 | Doak | Feb. 3, 1959 |
| 2,877,500 | Rainer et al. | Mar. 17, 1959 |
| 3,022,543 | Baird et al. | Feb. 27, 1962 |

OTHER REFERENCES

"Supersensitive Thermoelements," by Herber Pohl, Review of Scientific Instruments, May 1951, page 345.